United States Patent [19]

Degel et al.

[11]  4,010,002
[45]  Mar. 1, 1977

[54] REACTOR FOR THE CONTINUOUS REACTIVATION OF ACTIVATED CARBON PARTICLES

[75] Inventors: Josef Degel, Hattingen; Joachim Karweil; Dietrich George, both of Essen, all of Germany

[73] Assignee: Bergwerksverband GmbH, Essen, Germany

[22] Filed: Oct. 3, 1975

[21] Appl. No.: 619,398

[30] Foreign Application Priority Data

Oct. 5, 1974   Germany ..................... 2447603

[52] U.S. Cl. ............................ 23/284; 34/57 A; 252/411 R; 252/417
[51] Int. Cl.² ............... B01D 15/06; B01J 8/28; B01J 8/36
[58] Field of Search ............... 23/284, 288 S, 288 B; 252/417, 411 R, 411 S; 423/659 F; 34/10, 57 A; 432/15, 58

[56]  References Cited
UNITED STATES PATENTS

| 2,890,106 | 6/1959 | Heath | 23/284 |
| 2,906,609 | 9/1959 | Harper | 23/288 S |
| 3,147,084 | 9/1964 | Franzen et al. | 23/288 R |
| 3,571,946 | 3/1971 | Karweil et al. | 23/284 X |
| 3,700,563 | 10/1972 | Karweil et al. | 252/417 X |

Primary Examiner—Joseph Scovronek
Attorney, Agent, or Firm—Michael J. Striker

[57] ABSTRACT

The reactor has a reactor chamber bounded by a peripheral wall, and the reactor chamber is subdivided by an upright partition wall into an inlet chamber and an outlet chamber. The partition wall extends transversely of the chamber and has free ends each of which is spaced from a juxtaposed portion of the peripheral wall by a distance equal to between substantially 10–30% of the cross-sectional dimension of the reactor chamber in a plane connecting these juxtaposed wall portions. The partition wall is laterally offset by between substantially 10 – 30% of the diameter of the chamber in the direction of offset so that the inlet chamber is larger than the outlet chamber. An inlet communicates with the inlet chamber to admit into the same carbon particles which require reactivation and has an opening having a cross-sectional area equal to between substantially 5 – 25% of the surface area of a bottom wall bounding said reactor chamber, and an outlet which communicates with the outlet chamber to remove activated carbon particles from the same, the particles from the inlet chamber being composed to pass through the gap between the free ends of the partition wall and the circumferential wall to reach the outlet chamber.

7 Claims, 3 Drawing Figures

REACTOR FOR THE CONTINUOUS REACTIVATION OF ACTIVATED CARBON PARTICLES

BACKGROUND OF THE INVENTION

The present invention relates to the continuous reactivation of activated carbon particles, and more particularly to a fluidized-bed reactor for the continuous reactivation of activated carbon particles.

Activated carbon particles are used as adsorption media for cleaning of gases and liquids. During the adsorption cycle, during which the carbon particles remove contaminants from the gases or liquids, the carbon particles become contaminated with more and more of the retained contaminants and thus become less and less effective for the intended purpose. After a certain time, their effectiveness has decreased to such a point that the carbon particles must be reactivated, i.e., must be freed of the contaminants, in order to be capable of operating again in the intended manner.

Carbon particles used for cleaning of liquids are usually poured onto beds of sand or gravel in an adsorber through which the liquid is passed. When these carbon particles require reactivation, they are flushed out of the adsorber either by means of air or by means of water, or else they are mechanically removed from the adsorber. The trouble with this is that this approach makes it impossible to preclude the removal of at least small quantities of sand, gravel and/or sludge from the adsorber, which then travel with carbon particles into the reactor in which the carbon particles are to be regenerated. During the regeneration in the reactors, particularly in fluidized-bed reactors, there is simultaneously a separation of the carbon particles from the quantities of sand, gravel or the like, which have traveled with them and which settle on the bottom of the fluidized bed reactor, i.e., on the perforate wall on which the fluidized bed is established. Over a period of time, the thus settled undesirable components accumulate and ultimately lead to interference with the proper reactivating operation. The reason for this is twofold in that the accumulated sand or gravel reduces the usable volume of the reactivating reactor, and further in that the sand or gravel tends to settle and compact, clogging the openings in the bottom wall on which the fluidized bed is supported, so that the bed is no longer properly capable of being fluidized and the reactor must be disassembled and cleaned.

A prior art proposal has been made to overcome these problems, in that a fluidized-bed reactor is used which is provided with concentric baffles arranged in the reactor chamber which are provided with openings for the passage of material and through which the material must pass in a labyrinthine fashion. However, contrary to earlier expectations, this approach has not been found to be satisfactory because even with this type of construction, clogging will ultimately occur, again in particular clogging of the openings in the bottom wall on which the fluidized bed is to be established and maintained. The reactor must then be taken apart and cleaned, because of the rather complicated construction resulting from the use of the aforementiond baffles, this is even more difficult and time consuming than in the earlier-mentioned type of reactor.

SUMMARY OF THE INVENTION

Accordingly, it is an object of the present invention to provide an improved reactor for the continuous reactivation of activated particles, which is not possessed of the disadvantages of the prior art.

More particularly, it is an object of the present invention to provide such a reactor which is capable of producing highly satisfactory reactivation of the activated carbon particles and which is simple in its construction and can be cleaned in a very simple manner without prolonged downtime.

An additional object of the invention is to provide such a reactor which is a fluidized-bed reactor.

In keeping with these objects, and with others which will become apparent hereafter, one feature of the invention resides in a fluidized-bed reactor for the continuous reactivation of activated carbon particles. Briefly stated, the invention comprises first wall means bounding a reactor chamber and including a peripheral wall. Outlet means communicates with the reactor chamber for discharging from the same carbon particles which have been reactivated. Inlet means also communicates with the reactor chamber for admitting into the same carbon particles which are to be reactivated and which travel from the inlet means to the outlet means. Partition wall means is provided according to the invention, extending across the path of travel of the carbon particles in the reactor chamber and subdividing the latter into one compartment with which the inlet means communicates and another compartment with which the outlet means communicates. The partition wall has free ends which are spaced from respective juxtaposed portions of the peripheral wall by distances equal to between substantially 10–30% of the cross-sectional dimension of the reactor chamber in a plane passing through these wall portions.

Of course, the strength and structural rigidity of the partition wall can be further increased by means of supports of any desired type, for example, supports leading from the partition wall to the peripheral wall and/or the bottom wall on which the partition wall is mounted. The partition wall can itself be composed of a plurality of individual discrete wall portions and provided with passages for the material, without thereby disadvantageously influencing the effectiveness of the reactor in terms of the desired reactivation of the spent carbon particles.

It has been found that, quite surprisingly, such a simple partition wall assures in an adequate manner that all spent carbon particles admitted into the reactor will remain therein for the necessary length of time to become reactivated, but will not remain therein for an excessive length of time. Without the presence of the partition wall according to the present invention, a proportion of the admitted spent carbon particles would remain in the reactor for too short a time to become properly activated because they would reach the outlet means too quickly and thus leave the reactor in only partially activated state. Another proportion of the admitted spent carbon particles would remain for too long a period of time in the reactor, becoming not only reactivated but in fact becoming partly oxidized so that losses of carbon particles would take place. Thus, the presence of the partition wall according to the present invention assures that the dwell time of the incoming carbon particles, that is the spent carbon particles, in the reactor is sufficiently long for all of the carbon particles to become properly reactivated, and that it is substantially uniform for all of the admitted carbon particles so that none of the reactivated carbon particles have remained in the reactor chamber for any period of time which is significantly longer or significantly shorter than any other particles so admitted.

In addition, the construction according to the present invention is so simple that it does not interfere with cleaning of the reactor to remove contaminants, and in fact even permits such cleaning during the actual operation of the reactor.

In order to be able to provide an inlet opening into the reactor chamber which has as large as possible a cross-sectional area, the partition wall is advantageously offset somewhat from the center of the reactor chamber in the direction towards the outlet chamber, so that the inlet chamber is somewhat larger than the outlet chamber. The degree of offset of the partition wall from the center of the reactor chamber is preferably between substantially 10 and 30%, most advantageously between substantially 15 and 25% of the reactor diameter.

It is desirable to prevent the contaminants which enter the reactor chamber with the carbon particles, namely not the contaminants which adhere to the carbon particles but those which travel with them in the form of sand, gravel or sludge, from collecting below the inlet opening on the perforated wall on which the fluidized bed is provided. To prevent this, the cross-sectional area of the inlet opening should be relatively large and should advantageously be on the order of between 5–25%, preferably 10–20%, of the cross-sectional area of the perforated wall on which the fluidized bed exists. In this manner, the incoming spent carbon particles are immediately distributed over a relatively large surface area in the reactor chamber. Furthermore, appropriate baffles or other devices may be installed in the inlet which can readily assure that the incoming spent carbon particles are uniformly or substantially uniformly distributed over the cross-sectional area of the inlet opening as they enter the reactor. The gases which develop in the reactor can freely exit from the reactor chamber through the inlet opening in counterflow to the incoming carbon particles.

In order to permit simpler cleaning of the reactor, it is advantageous if closeable openings are provided upwardly of the fluidized-bed wall in the peripheral wall bounding the reactor chamber, approximately on lines constituting extensions of the partition wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
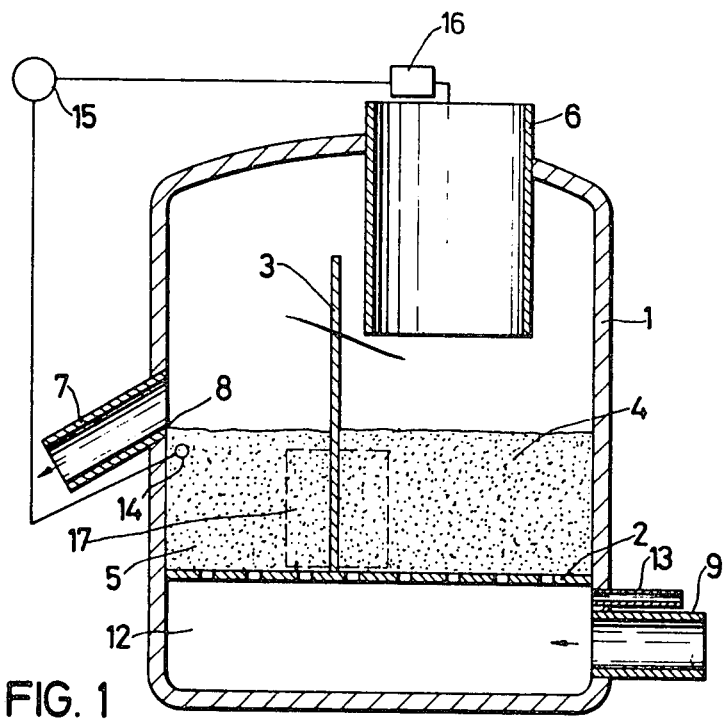
FIG. 1 is a somewhat diagrammatic vertical section through a reactor according to the present invention.
Figure 2:
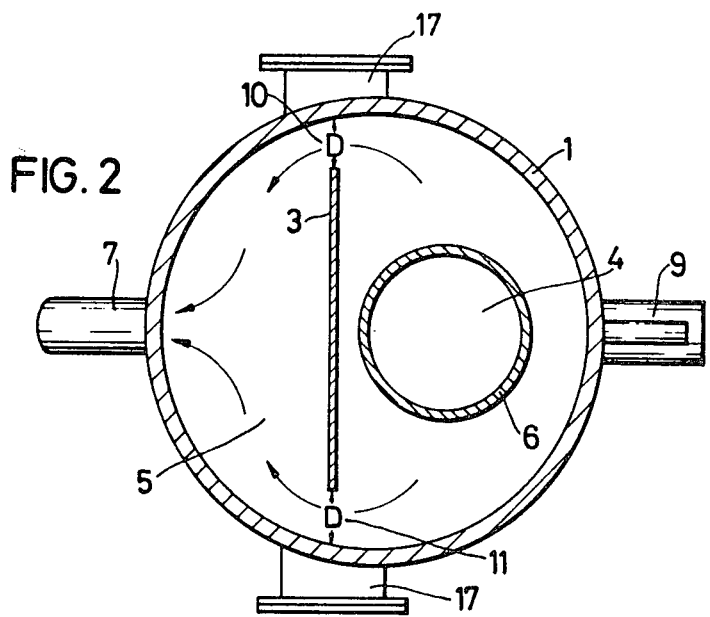
FIG. 2 is a horizontal section through the reactor of FIG. 1.

FIGS. 1 and 2 illustrate a first embodiment of the invention. They show a fluidized-bed reactor having a reactor chamber which in the illustrated embodiment is of circular cross section and has a diameter of e.g., 800 mm, but which could also be of oval cross section, of rectangular cross section, or the like and have different diameters. In the reactor 1 there is provided a fluidizing bottom wall 2 which is perforated and on which there is mounted an upstanding partition wall 3 which extends across the reactor chamber to subdivide the latter into an inlet compartment 4 and an outlet compartment 5. In the illustrated embodiment, the partition wall 3 is offset towards the left from the center of the reactor chamber by approximately 200 mm. The partition wall 3 has free ends each of which is spaced from the respectively juxtaposed surface portion of the circumferential or peripheral wall of the reactor 1 by substantially 10–30% of the total distance between these respective surface portions, i.e., the distance between these surface portions in a plane which passes through the surface portions and, as the partition wall 3 in FIGS. 1 and 2 is perfectly planar, a line which is located in the plane of the partition wall 3. This distance, identified with reference character D in FIG. 2, is assumed for the illustrated embodiment to be 150 mm.

An inlet 6 is provided through which the spent carbon particles drop into the inlet compartment 4 to form a fluidized bed on the wall 2. In this fluidized bed, they travel through the gaps 10 and 11 between the ends of the partition wall 3 and the juxtaposed surface portion of the peripheral wall of the reactor chamber into the outlet compartment 5, leaving the latter through the outlet tube 7. The lowermost level at which the outlet tube 7 communicates with the chamber 5 is designated with reference numeral 8 in FIG. 1 and is so located that it serves as an overflow, i.e., the height of the fluidized bed on the wall 2 will remain uniform because once the height tends to become exceeded, the excess material will flow out through the outlet tube 7.

The hot gases required for reactivating the carbon particles, i.e., for expelling from them the contaminants previously adsorbed by them, are produced in known manner, for example by combusting a combustible gas in the presence of air (no instrumentality shown because known per se to those skilled in the art) and are admitted via the inlet pipe 9 into the space 12 below the wall 2 so that they enter the reactor chamber through the perforations in the wall 2, producing the fluidized bed above the wall 2. Of course, if desired, the reactivating gases could also be provided by combusting the media directly in the space 12. It is advantageous if the temperature of the reactivating gas is maintained as constant as possible. For this purpose, water or another coolant may be admitted via the line 13 into the space 12 from time to time, as required to maintain the gas temperature uniform.

The temperature of the fluidized bed itself in the compartments 4 and 5 can vary widely because the moisture content of the spent incoming carbon particles may similarly vary greatly. If carbon particles with a high moisture content are admitted into the reactor, the temperature in the fluidized bed will automatically drop, and vice versa.

To assure that a uniform reactivation is obtained, the final reactivating temperature should also be maintained as constant as possible. For this purpose, a temperature sensor 14 may be provided, of which many types are known to those skilled in the art, and this is connected via an electrical line with a regulator 15 and the latter, in turn, is connected with a feed-control device 16 (also known per se to those skilled in the art) so that the admission of additional spent carbon particles through the inlet 6 is controlled by the device 16 in dependence upon the temperature sensed by the sensor 14. Thus, if the sensor 14 senses a decrease in the temperature of the fluidized bed, it retards or temporarily stops the admission of additional spent carbon particles, and vice versa.

FIGS. 1 and 2 both show that the peripheral wall of the reactor 1 is provided with lateral inspection ports 17 which are normally closed but which can be opened for cleaning purposes. Each of the ports 17 is located opposite one of the free ends of the partition wall 3 and when one or both of the ports 17 are opened, the compartments 4, 5 can be cleaned of accumulated sand, gravel, or encrustations formed by sludge or the like, by inserting an appropriate scraper tool or similar device. A cooling of the reactor or in fact an interruption of its operation are not absolutely necessary for this purpose, and the removal of these comtaminants from the wall 2 does not interfere with the operation of the reactor nor with the quality of reactivation of the carbon particles. In fact, the amount of time required for carrying out a cleaning of a reactor of the type shown in FIGS. 1 and 2 and having the approximate dimensions mentioned earlier, requires no more than a few minutes.

Figure 3:
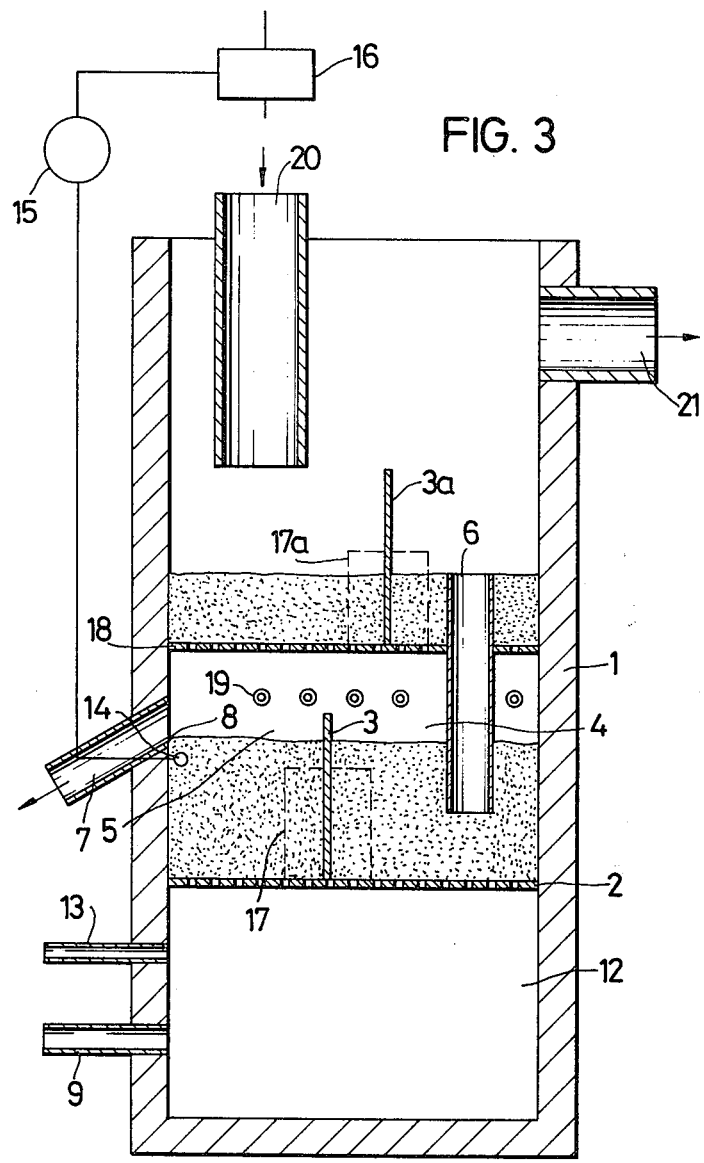
FIG. 3 is a view similar to FIG. 1, but illustrating a two-level reactor according to the invention.

FIG. 3 shows a further embodiment of the invention in a two-level reactor. Like reference numerals identify like components as before. In addition to the compartments a 4 and 5, the reactor in FIG. 3 has above these compartments a second wall 18 which corresponds to the wall 2 and which is provided with a second upright partition wall 3a corresponding to the wall 3. Conduits 19 are provided through which air or the like can be blown into the compartments 4 and 5 to establish and maintain a fluidized bed on the upper level, i.e. above the wall 18.

The reactor in FIG. 3 has the inlet 20 which corresponds to the inlet 6 of FIGS. 1–2 and through which spent carbon particles are admitted. Unlike FIGS. 1 and 2, however, wherein the gases escape through the inlet 6 in counterflow to the incoming spent carbon particles, the reactor in FIG. 3 has a separate gas outlet conduit 21. The conduit 6 in FIG. 3 extends low enough on the lower level of the reactor so that its lower end is below the upper level of the fluidized bed; on the other hand, it penetrates through the wall 18 and its upper end serves as the overflow for the fluidized bed on the wall 18 on the upper level. Of course, these are in effect differences in structure, rather than in principle, because the operation of the reactor in FIG. 3 is essentially the same as in FIGS. 1 and 2. Ports 17a, corresponding to the ports 17 which are provided on the lower level, can also be provided on the upper level in FIG. 3. The ports 17a could be omitted and only the ports 17 provided, or vice versa. Also, it is conceivable to omit the partition wall 3 and to provide only the partition wall 3a, or vice versa.

The important aspect of the present invention, and one which is surprising because its result cannot be expected from the simple presence of the upright partition wall, is the fact that the single partition wall in a reactor chamber (on any particular level of a reactor chamber, if more than one level is provided) serves to automatically retard the flow of material through the reactor—from the inlet to the outlet—just sufficiently to assure that an excellent result of a continuous reactivation of carbon particles will be obtained.

For example, a reactor according to FIGS. 1 and 2 was operated in the following manner and the following results were obtained:

Spent carbon particles having a moisture content of 50% related to wet carbon, were passed through the reactor to form therein a fluidized bed of 0.3 meter height on the wall 2, for the purpose of continuous reactivation. Hot combustion gases from a burner were adjusted to a substantially constant temperature of 900° C by spraying of water to the space 12 into which they were admitted through the conduit 9. This gas traveled through the apertures in the wall 2 and fluidized the bed of carbon particles in the compartments 4 and 5. The temperature sensor 14 was utilized to automatically control the admission of additional spent carbon particles via the device 16, so as to maintain the fluidized bed at a temperature of 720° C.

Per hour, an average of 200 kg of spent activated carbon particles were admitted through the inlet 6 and 95 kg of dry reactivated carbon particles were withdrawn per hour via the outlet tube 7.

It was found that after reactivation, the carbon particles had the identical adsorption capability as the original carbon particles before the same were used for adsorption purposes, i.e., before they became spent. This shows that a reactor according to the present invention is capable of restoring spent carbon particles to their original adsorption capability.

It will be understood that each of the elements described above, or two or more together, may also find a useful application in other types of constructions differing from the type described above.

While the invention has been illustrated and described as embodied in a fluidized-bed reactor, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a fluidized-bed reactor for continuous reactivation of activated carbon particles, a combination comprising a closed housing having a peripheral wall and a transverse perforated wall which divides said housing into a reaction chamber located above said perforated wall and a second chamber located below said perforated wall; outlet means communicating with said reaction chamber for discharging from the same carbon particles which have been reactivated; first inlet means communicating with said reaction chamber for admitting into the same carbon particles which are to be reactivated and which travel from said inlet means to said outlet means, said first inlet means including an inlet opening having a cross-sectional area equal to between substantially 5 – 25% of the surface area of said perforated transverse wall; second inlet means communicating with said second chamber below said perforated transverse wall for admitting into the same hot gases required for reactivating of said carbon particles; and a substantially planar partition wall extending across the path of travel of said carbon particles in said reaction chamber and subdividing the latter into one compartment with which said first inlet means communicates and another compartment with which said outlet means communicates, said partition wall having free ends spaced from respective juxtaposed portions of said peripheral wall by distances equal to between substantially 10 – 30% of the cross-sectional dimension of said reaction chamber in a plane passing through said wall portions, said partition wall being laterally offset from the center of said reaction chamber in such a manner that said one compartment with which said first inlet means communicates is larger than said another compartment with which said outlet means communicates, the offset being between substantially 10–30% of the diameter which said reaction chamber has in the direction of offset; said peripheral wall being provided in at least one of said wall portions with a cleaning port which can be opened and closed and which is located opposite one of said free ends of said partition wall so that said port communicates with said one and also with said another compartment of said reaction chamber.

2. In a fluidized-bed reactor for continuous reactivation of activated carbon particles, a combination comprising a closed housing having a peripheral wall and a transverse perforated wall which divides said housing into a reaction chamber located above said perforated wall and a second chamber located below said perforated wall; outlet means communicating with said reaction chamber for discharging from the same carbon particles which have been reactivated; first inlet means communicating with said reaction chamber for admitting into the same carbon particles which are to be reactivated and which travel from said inlet means to said outlet means, said first inlet means including an inlet opening having a cross-sectional area equal to between substantially 5 – 25% of the surface area of said perforated transverwe wall; second inlet means communicating with said second chamber below said perforated transverse wall for admitting into the same hot gases required for reactivating of said carbon particles; and a substantially planar partition wall extending across the path of travel of said carbon particles in said reaction chamber and subdividing the latter into one compartment with which said first inlet means communicates and another compartment with which said outlet means communicates, said partition wall having free ends spaced from respective juxtaposed portions of said peripheral wall by distances equal to between substantially 10 – 30% of the cross-sectional dimension of said reaction chamber in a plane passing through said wall portions, said partition wall being laterally offset from the center of said reaction chamber in such a manner that said one compartment with which said first inlet means communicates is larger than said another compartment with which said outlet means communicates, the offset being between substantially 10 – 30% of the diameter which said reaction chamber has in the direction of offset, thereby providing in said one compartment a space which is sufficiently large so that the incoming spent carbon particles extending through said first inlet means are immediately distributed over a relatively large surface area in said one compartment of the reactor chamber.

3. A combination as defined in claim 2, wherein said partition wall is offset from said center by between substantially 15–25% of the diameter which said reactor chamber has in the direction of offset.

4. A combination as defined in claim 2, said outlet means being provided in said peripheral wall, and said reactor chamber having a center; and wherein said partition wall is laterally offset from said center in direction towards said outlet means.

5. A combination as defined in claim 2, said inlet means including an inlet opening having a cross-sectional area equal to between substantially 10–20% of the surface area of a transverse wall bounding said reactor chamber and into which said inlet opening discharges.

6. A combination as defined in claim 2, wherein said chamber has two vertically spaced perforate transverse walls on each of which a fluidized bed of said carbon particles is formed, and an overflow connecting the upper bed with the lower bed.

7. A combination as defined in claim 2; further comprising control means for controlling the inflow of carbon particles through said inlet means, and temperature sensing means for sensing the temperature of the fluidized bed in said other compartment and for controlling the operation of said control means as a function of the sensed temperature.

* * * * *